United States Patent [19]
Fujishima

[11] 4,422,104
[45] Dec. 20, 1983

[54] TIME BASE ERROR CORRECTING APPARATUS FOR VIDEO PLAYER

[75] Inventor: Tooru Fujishima, Yokohama, Japan

[73] Assignee: Hitachi, Ltd., Tokyo, Japan

[21] Appl. No.: 256,683

[22] Filed: Apr. 23, 1981

[30] Foreign Application Priority Data

Apr. 23, 1980 [JP] Japan .................................. 55-52958

[51] Int. Cl.³ ............................................. H04N 5/76
[52] U.S. Cl. ..................................... 358/322; 358/326
[58] Field of Search ................ 358/319, 321, 322, 326

[56] References Cited

U.S. PATENT DOCUMENTS

| | | | |
|---|---|---|---|
| 3,769,449 | 10/1973 | Inoue ..................................... | 358/321 |
| 3,938,180 | 2/1976 | Arimura et al. ..................... | 358/326 |
| 3,967,311 | 6/1976 | Fuhrer ................................... | 358/322 |
| 4,024,571 | 5/1977 | Dischert et al. ................. | 358/319 X |
| 4,110,761 | 8/1978 | Watatani .............................. | 358/326 |
| 4,127,866 | 11/1978 | Yamashita ....................... | 358/326 X |
| 4,313,129 | 1/1982 | Fukji .................................... | 358/322 |

*Primary Examiner*—Raymond F. Cardillo, Jr.
*Assistant Examiner*—Donald McElheny, Jr.
*Attorney, Agent, or Firm*—Antonelli, Terry & Wands

[57] ABSTRACT

A time base error correcting apparatus for a video disk player including a pickup means picking up a video signal recorded on a video disk, a burst gate stage extracting a burst signal from the detected video signal, and a phase comparison stage comparing the phase of the extracted burst signal with that of an output signal from a reference frequency signal oscillator to provide an output signal indicative of the result of phase comparison which is used to control a system correcting an error of the time base of the chrominance loop and to control a pickup control unit controlling the relative positions of the information pickup means and the video disk. In the apparatus, a gate circuit is provided so as to inhibit application of the phase comparison output signal to the pickup control unit controlling the relative positions of the information pickup and the disk, during at least a period of time of about 200 μsec to 300 μsec immediately after the period of time of 9H in which the burst signal disappears in each vertical blanking period.

20 Claims, 4 Drawing Figures

TIME BASE ERROR CORRECTING APPARATUS FOR VIDEO PLAYER

BACKGROUND OF THE INVENTION

This invention relates to a time base error correcting apparatus for use in an information reproducing apparatus such as a video disk player.

FIG. 1 is a block diagram showing the structure of a prior art time base error correcting apparatus used in a video disk player. Referring to FIG. 1, an information signal recorded on a recording medium or disk 1 is picked up or detected by an information pickup means 2 including a signal detector and a pre-amplifier to provide a detected information output signal, and this output signal is demodulated in an FM demodulation stage 3 including an FM demodulating circuit to provide a demodulated information output signal 4. The frequency of the chrominance subcarrier in this output signal 4 from the FM demodulation stage 3 is lower than the normal frequency since the chrominance subcarrier frequency has been shifted to a lower level during recording the information signal on the disk 1. In a frequency conversion stage 5, the chrominance subcarrier frequency having been shifted to the lower level is converted into the normal frequency. In a burst gate stage 6, the burst signal is extracted from the chrominance information on the chrominance subcarrier converted into the normal frequency. In a phase comparison (phase detector) stage 7, the phase of the extracted burst signal is compared with that of a reference frequency signal applied from a reference frequency oscillator 8, and an output signal 9 indicative of the result of phase comparison appears from the phase comparison stage 7. This output signal 9 from the phase comparison stage 7 is applied to a sample-hold stage 10 to be subjected to sampling-holding and is then applied to a voltage controlled oscillator 12 (abbreviated hereinafter as a VCO) through a filter stage 11 including a lag-lead filter and a DC amplifier to be utilized for the control of the VCO 12. The output signal from the VCO 12 is applied to another input terminal of the frequency conversion stage 5 so that the aforementioned frequency conversion can be satisfactorily carried out.

The output signal from the sample-hold stage 10 is applied also to the information pickup means 2 through a pickup control unit 13 including a phase compensating stage and a driver stage to be utilized for the control of the position of the signal detector of the information pickup means 2 relative to the disk 1. The output signal 4 from the FM demodulation stage 3 is also applied to a synchronizing signal separating circuit 14 in which the synchronizing signal is separated from the input signal 4. The synchronizing signal thus separated is applied to a burst gate pulse generating circuit 15 which generates the burst gate pulses used in the burst gate stage 6 and the sampling pulses used in the sample-hold stage 10. The video output signal appears on an output terminal 20 to be applied to a video reproducing system.

The time base error correcting apparatus having such a construction has been generally used to correct an error of the time base of the luminance and chrominance loop by the system including the pickup means 2 and also to correct an error of the time base of the chrominance loop by the system including the VCO 12.

In the prior art apparatus shown in FIG. 1, a pulse voltage as shown in FIG. 2(a) has tended to appear in the output signal from the sample-hold stage 10 immediately after the period of time Tb (=9 H) in which the burst signal disappears in the vertical blanking period, and a transient response, as shown in FIG. 2(b), resulting in improper color reproduction or skewing in an upper portion of a reproduced picture has tended to appear in the output signal from the pickup control unit 13 due to the appearance of the pulse voltage shown in FIG. 2(a).

Such a pulse voltage appears generally due to the fact that the phase of the chrominance signal changes stepwise in the period immediately after the period Tb since no burst signal is present in this period Tb and a large variation of the time base (phase variation) occurs in the level of the chrominance frequency in this period Tb. Therefore, the prior art apparatus has been defective in that the system design becomes quite complex and difficulty is encountered for increasing the gain of the system including the information pickup means 2 beyond a limit in order that the improper color reproduction or skewing described above can be suppressed or reduced to a practically allowable leave.

SUMMARY OF THE INVENTION

It is a primary object of the present invention to provide an improved time base error correcting apparatus which obviates the prior art defects pointed out above and which can increase the gain of the system including the pickup means thereby improving the error correction performance in spite of the fact that it can be easily designed.

The apparatus according to one aspect of the present invention is featured by the fact that a gate circuit is provided to inhibit application of the output signal from the phase comparison stage 7 to the pickup control unit 13 during the period of time in which an excessive transient response may appear in that signal, so that such an excessive transient response may not greatly disturb the operation of the system including the pickup control unit 13.

DESCRIPTION OF THE PREFERRED EMBODIMENT

Figure 3:
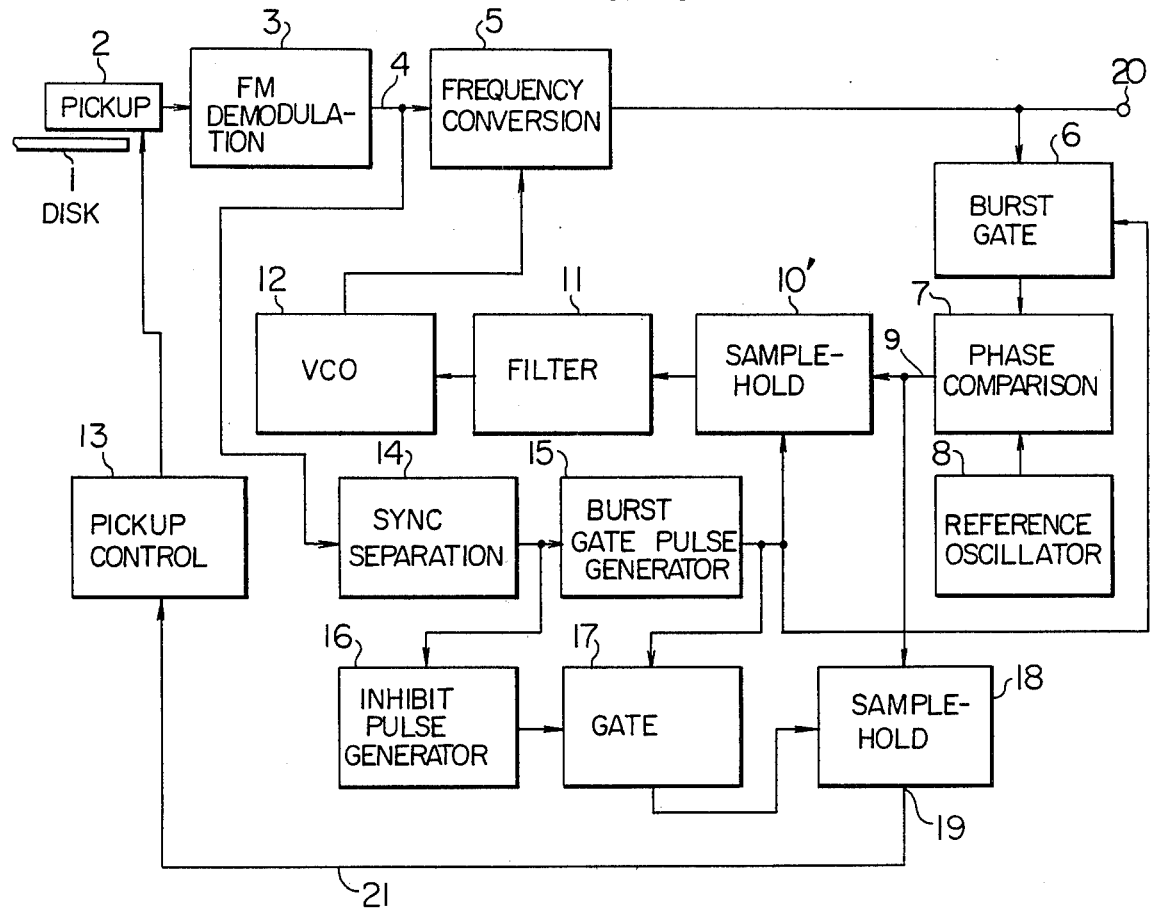
FIG. 3 is a block diagram showing the structure of an embodiment of the time base error correcting apparatus according to the present invention.

A preferred embodiment of the time base error correcting apparatus according to the present invention will now be described with reference to FIG. 3. In FIG. 3, the same reference numerals are used to designate the same or equivalent parts appearing in FIG. 1, and, therefore, any detailed description of such parts is unnecessary.

Referring now to FIG. 3, a sampling inhibit pulse generating circuit 16 provided according to the present invention is connected at its input terminal to the output terminal of the synchronizing signal separating circuit 14 so as to utilize the output signal from the synchronizing signal separating circuit 14 for generating a sampling inhibit pulse of predetermined duration which appears at the output terminal of the inhibit pulse generating circuit 16 in each vertical blanking period to be applied to a gate circuit 17 which is also provided according to the present invention. The gate circuit 17 is connected at its input terminal to the output terminal of the burst gate pulse generating circuit 15 and at its control input terminal to the output terminal of the sampling inhibit pulse generating circuit 16. The gate circuit 17 is actuated by the sampling inhibit pulse applied to its control input terminal to control or inhibit passage therethrough of the sampling pulses applied from the burst gate pulse generating circuit 15. In the absence of the inhibit pulse, the sampling pulses permitted to pass through the gate circuit 17 are applied from the output terminal of the gate circuit 17 to a second sample-hold stage 18 which is also provided according to the present invention.

Figure 1:
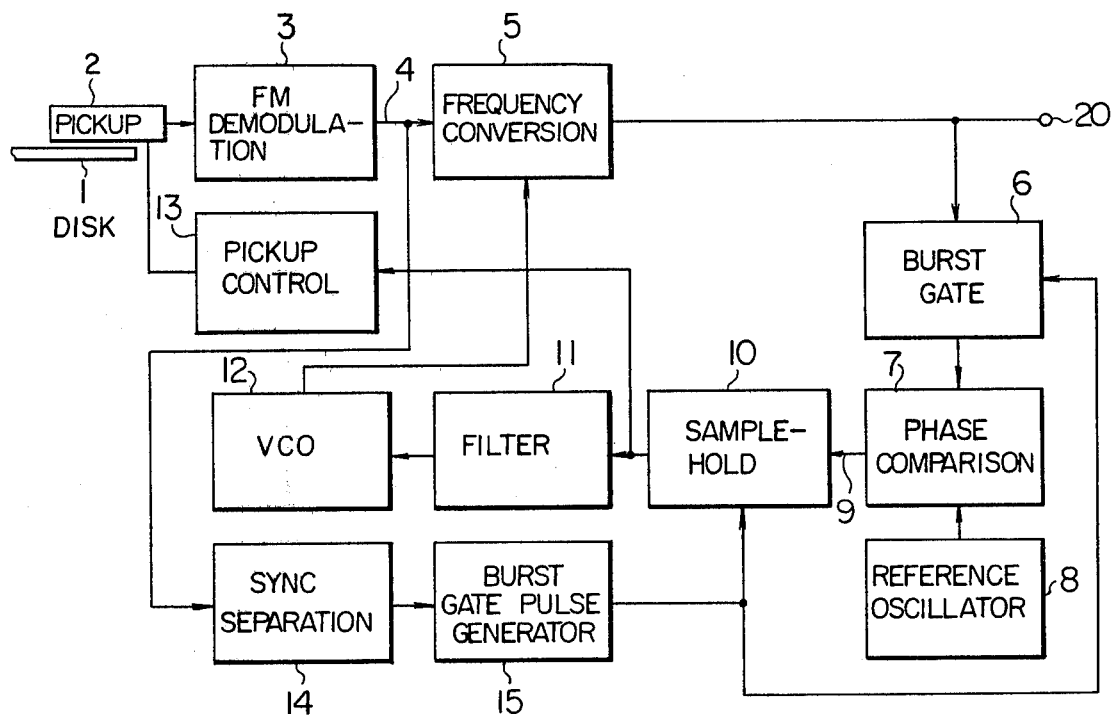
FIG. 1 is a block diagram showing the structure of the prior art time base error correcting apparatus.
Figure 2:
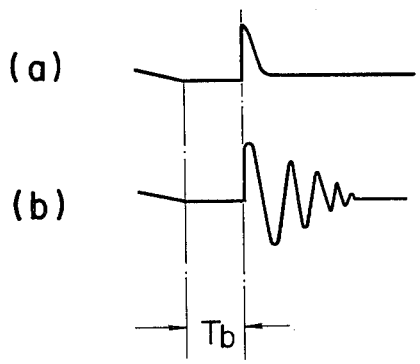
FIG. 2 is a signal waveform diagram illustrating transient operation of the prior art apparatus shown in FIG. 1.

In the prior art apparatus shown in FIG. 1, there is only one sample-hold stage 10, and its output signal is applied to the filter stage 11 and to the pickup control unit 13. In contrast, in the embodiment of the present invention, the output signal from the first sample-hold stage 10' is applied to the filter stage 11 only and is not applied to the pickup control unit 13. Although the second sample-hold stage 18 is connected at its input terminal to the output terminal of the phase comparison stage 7 as in the case of the first sample-hold stage 10', its output signal is applied to the pickup control unit 13 only by way of coupling means 21 in the form of a conductor and is not applied to the filter stage 11. The first sample-hold stage 10' is connected at its sampling pulse input terminal to the output terminal of the burst gate pulse generating circuit 15. The second sample-hold stage 18 is connected at its sampling pulse input terminal to the output terminal of the burst gate pulse generating circuit 15 through the gate circuit 17.

As described hereinbefore, the sampling inhibit pulse generating circuit 16 generates an inhibit pulse of predetermined duration appearing in each vertical blanking period for inhibiting application of the sampling pulses to the second sample-hold stage 18. It is required that the period of time for inhibiting application of the sampling pulses to the second sample-hold stage 18 be longer than the period of time Tb immediately after which a pulse voltage giving rise to an excessive transient response may appear in the output signal 9 from the phase comparison stage 7 (that is, the period of time of 9 H (repetition period of horizontal sync) in which the burst signal is not present in the vertical blanking period), and this longer period of time will be referred to hereinafter as $T_G$ in the present invention. Thus, there is the relation $T_G > Tb$ between $T_G$ and Tb.

Figure 4:
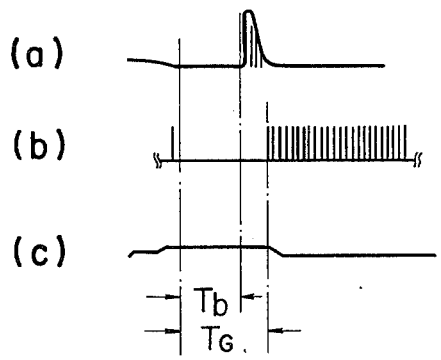
FIG. 4 is a signal waveform diagram illustrating the operation of the apparatus of the present invention shown in FIG. 3.

The sampling inhibit pulse generating circuit 16, which generates the inhibit pulse on the basis of the output signal from the synchronizing signal separating circuit 14, applies the inhibit pulse to the gate circuit 17 so that the gate circuit 17 gates the sampling pulses applied from the burst gate pulse generating circuit 15 during the period of time $T_G$. Consequently, as shown in FIG. 4(b), the sampling pulses are inhibited to pass through the gate circuit 17 during the period of time $T_G$ including the period of time Tb immediately after which a pulse voltage giving rise to an excessive transient response may appear in the output signal from the phase comparison stage 7. The period of time $T_G$ is preferably at least Tb plus about 200 μsec to 300 μsec.

The value of 200 μsec to 300 μsec specified above is based upon the result of actual measurement of the period of time in which an excessive transient response as described above may appear. However, when the above period of time is selected to be excessively long, undesirable distortion may occur in an upper portion of ja reproduced picture.

The sampling pulses passed through the gate circuit 17 are applied to the second sample-hold stage 18 to be used for sampling-holding of the output signal 9, shown in FIG. 4(a), from the phase comparison stage 7, and the resultant output signal 19 from the second sample-hold stage 18 having a waveform as shown in FIG. 4(c) is applied to the pickup control unit 13. This output signal 19 from the second sample-hold stage 18 is indicative of the time base error information and applied to the pickup control unit 13 to be used for controlling the relative positions of the disk 1 and the signal detector of the information pickup means 2.

It will be understood from the foregoing description of the present invention that correcting an error of the time base of the chrominance loop including the VCO 12 is at first performed during the period of time $T_G$ so that an excessive transient response due to an impulse voltage appearing in the output signal from the phase comparison stage 7, to which the burst signal is applied, may not adversely affect the operation of the servo system which controls the relative positions of the disk 1 and the signal detector in the information pickup unit 2. Therefore, the possibility of disturbance of the operation of the servo system can be minimized to greatly increase the gain of the servo system.

It will be appreciated that the present invention can provide a time base error correcting apparatus which can be readily designed and which can operate with improved performance by additional provision of relatively simple means.

I claim:

1. A time base error correcting apparatus for a video player including: pickup means for picking up an information signal including a burst signal recorded on a recording medium; a demodulation stage demodulating the information signal from said pickup means; a frequency conversion stage converting the frequency of an output signal from said demodulation stage and providing a demodulated information signal; an output terminal supplying said demodulated information signal to reproducing means; a burst gate stage selectively extracting said burst signal from said demodulated information signal; a reference signal oscillator generating a reference signal; a phase comparison stage comparing a phase of said extracted burst signal with that of said reference signal to provide a phase comparison output signal indicative of a result of phase comparison from an output terminal thereof; a first sample-hold stage sampling and holding said phase comparison output signal to provide a first sample-hold output signal; a voltage controlled oscillator for supplying an output signal to said frequency conversion stage and having an oscillation frequency which varies in response to said first sample-hold output signal; a synchronizing signal separating circuit separating a synchronizing signal component from said output signal from said demodulation stage and having an output terminal providing an output of a separated synchronizing signal component; a burst gate pulse generating circuit generating burst gate pulses and sampling pulses on the basis of said separated synchronizing signal component for controlling said burst gate state and said first sample-hold stage in accordance therewith, said burst gate pulse generating circuit having an output terminal connected to said burst gate stage and said first sample-hold stage; and pickup control means having an input terminal and controlling relative positions of said pickup means and said recording medium, wherein the improvement comprises a sampling inhibit pulse generating circuit having an input terminal connected to said output terminal of said synchronizing signal separating circuit and an output terminal supplying a sampling inhibit pulse covering a period of time longer than a period of time in which said burst signal disappears in each vertical blanking period for said information signal; a gate circuit having an input terminal connected to said output terminal of said burst gate pulse generating circuit, a control input terminal connected to said output terminal of said sampling inhibit pulse generating circuit and an output terminal normally permitting appearance of said sampling pulses therefrom but inhibiting appearance of said sampling pulses during a period of time in which said sampling inhibit pulse is applied to said control input terminal; a second sample-hold stage having an input terminal connected to said output terminal of said phase comparison stage, a control input terminal connected to said output terminal of said gate circuit, and an output terminal supplying a second sample-hold output signal obtained by sampling and holding said phase comparison output signal by said sampling pulses passed through said gate circuit; and coupling means for connecting said output terminal of said second sample-hold stage to said input terminal of said pickup control means so as to apply said second sample-hold output signal to said pickup control means.

2. A time base error correcting apparatus according to claim 1, wherein the period of time covered by said sampling inhibit pulse is at least 200 μsec longer than the period of time in which said first signal disappears in each vertical blanking period.

3. A time base error correcting apparatus according to claim 1, wherein the period of time covered by said sampling inhibit pulse is between 200 μsec and 300 μsec longer than the period of time in which said burst signal disappears in each vertical blanking period.

4. A time base error correcting apparatus according to claim 1, wherein said recording medium is a recording disc.

5. A time base error correcting apparatus according to claim 2, wherein said recording medium is a recording disc.

6. A time base error correcting apparatus for a video player comprising pickup means for detecting a color video signal including a color burst signal from a recording medium, first gate means for extracting the color burst signal from the detected color video signal, phase comparison means for comparing a phase of the extracted color burst signal with that of a reference signal and providing a comparison output signal indicative of the comparison, pickup control means for supplying the comparison output signal from the phase comparison means to the pickup means for correcting a relative position of the pickup means and the recording medium, and second gate means for inhibiting the supplying of the comparison output signal from the comparison means occurring at least for a predetermined period of time immediately after a period of time in which the color burst signal disappears in each vertical blanking period to the pickup control means.

7. A time base error correcting apparatus according to claim 6, wherein the predetermined period of time is at least 200 μsec.

8. A time base error correcting apparatus according to claim 6, wherein the predetermined period of time is between 200 μsec and 300 μsec.

9. A time base error correcting apparatus according to claim 6, wherein the recording medium is a recording disc.

10. A time base error correcting apparatus according to claim 6, further comprising synchronizing signal separating means for separating a synchronizing signal from the detected color video signal, burst gate pulse generator means responsive to the separated synchronizing signal for generating burst gate pulses and sampling pulses, the first gate means being responsive to the burst gate pulses, sampling inhibiting pulse generating means being responsive to the separated synchronizing signal for generating a sampling inhibit pulse for at least the predetermined period of time, the second gate means including a gate circuit having an input terminal for receiving the sampling pulses from the burst gate pulse generator means and a control input terminal for receiving the sampling inhibit pulse and for inhibiting the gating of sampling pulses therethrough in response to the sampling inhibit pulse, and sample-hold means responsive to the sampling pulses gated by the gate circuit for sampling and holding the comparison output signal of the phase comparison means and for supplying the sampled comparison output signal to the pickup control means whereby the comparison output signal is inhibited from being sampled and supplied to the pickup control means at least for the predetermined period of time.

11. A time base error correcting apparatus according to claim 10, wherein the predetermined period of time is at least 200 μsec.

12. A time base error correcting apparatus according to claim 10, wherein the predetermined period of time is between 200 μsec and 300 μsec.

13. A time base error correcting apparatus according to claim 10, wherein the recording medium is a recording disc.

14. A time base error correcting apparatus according to claim 10, further comprising demodulation means for demodulating the detected color video signal from the pickup means and providing a demodulated output signal, frequency converter means for converting the frequency of the demodulated output signal and providing a frequency converted demodulated output signal, the burst gate means being responsive to the frequency converted demodulated output signal for extracting the color burst signal, the synchronizing signal separating means receiving the demodulated output signal for separating the synchronizing signal therefrom, another sample-hold means being responsive to the sampling pulses from the burst gate pulse generator means for sampling and holding the comparison output signal and providing a sample-hold output signal in accordance therewith, and voltage controlled oscillator means being responsive to the sample-hold output signal for varying the oscillation frequency thereof in accordance therewith and for supplying an output signal to the frequency converter means.

15. A time base error correcting apparatus according to claim 14, further comprising reference oscillator means for supplying the reference signal to the phase comparison means.

16. A time base error correcting apparatus according to claim 15, wherein the predetermined period of time is at least 200 μsec.

17. A time base error correcting apparatus according to claim 15, wherein the predetermined period of time is between 200 μsec and 300 μsec.

18. A time base error correcting apparatus according to claim 15, wherein the recording medium is a recording disc.

19. A time base error correcting apparatus according to claim 16, wherein the recording medium is a recording disc.

20. A time base error correcting apparatus according to claim 17, wherein the recording medium is a recording disc.

* * * * *